(No Model.)

C. FONTAYNE.
MAGIC LANTERN.

No. 273,055. Patented Feb. 27, 1883.

Witnesses
Chas. R. Burr
Jno. W. Stockett

Inventor:
Charles Fontayne
By Boyd Eliot
att'y

UNITED STATES PATENT OFFICE.

CHARLES FONTAYNE, OF JERSEY CITY, NEW JERSEY.

MAGIC LANTERN.

SPECIFICATION forming part of Letters Patent No. 273,055, dated February 27, 1883.

Application filed August 25, 1882. (No model.)

*To all whom it may concern:*

Be it known that I, CHARLES FONTAYNE, of Jersey City, county of Hudson, and State of New Jersey, have invented new and useful Improvements in Magic Lanterns, of which the following is a specification.

This invention pertains to that class of optical instruments known as "magic lanterns," used for the exhibition of small pictures by enlarging them upon a screen; and the invention consists in the use of a reflector, so arranged in a case or box relatively to the light and the picture or image that the rays, after passing through the plate upon which the image is formed, are caught by the reflector, and thence thrown upon the screen without the aid of any condensing or other lens, as will hereinafter appear.

Figure 1:
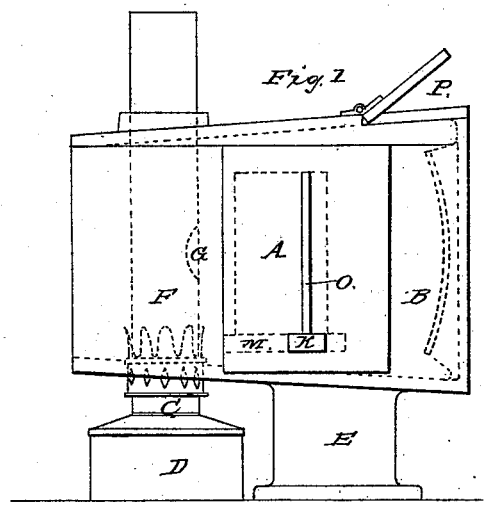
Figure 2:
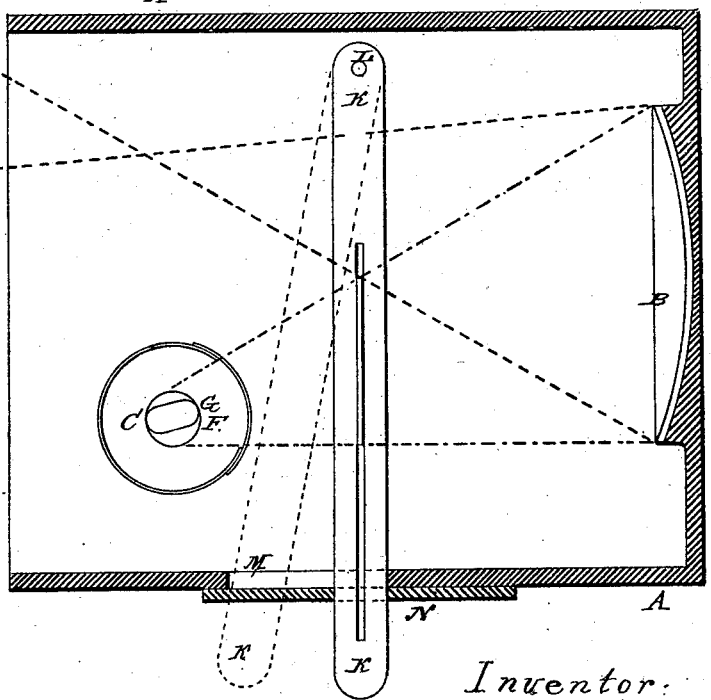

In the drawings, Figure 1 is a side elevation of the apparatus, one-half the size of the smallest lantern made on this plan. Fig. 2 is a horizontal section through the box, made full size of the plan shown at Fig. 1.

The chief object of this invention is to produce a very cheap and at the same time very effective instrument for the exhibition of transparent pictures, which may be very perfectly made by the photographic processes and transferred to small plates of glass, and therefore the box or case A may be made of card or paste board in length and width corresponding to the size shown at Fig. 1, and it is inclosed on all sides, except the end opposite to the reflector, which is shown at B, which may be of the well-known or common reflectors of silverized glass, or it may be of metal coated in any suitable manner. This reflector is fastened upon the inside of the closed end of the box and about, or it may be exactly at, the center and with the plane of its edge parallel to the face of the box, as shown at Fig. 2.

The lamp C is of the common form of small coal-oil lamps, with flat wick and cone corresponding to such lamps.

The body of the lamp D may rest on the table and serve as one of the supports to the box A, while the other end is supported on wooden or tin feet, as shown at E.

The chimney F of the lamp is made of metal, and has a hole, as at G, cut in one side opposite to the reflector to permit the light from the lamp to pass out to the picture on a plate at H. This hole G, which is of course opposite the brightest portion of the flame of the lamp, is opposite the center of the picture and the center of the reflector, considered horizontally. It is placed so far to one side that the extreme rays passing through the picture and upon the extreme edge of the reflector will form the same angle with the reflector as a line from the same extreme point of the picture will make when drawn to the opposite extreme edge of the reflector, or so that all the incident rays from the point of light passing through the picture and caught by the reflector will be thrown or reflected outside of the picture upon the screen, and without interfering with one another.

Any adjustment required may be effected by the support for the picture, which is shown at K, pivoted at one side of the box at L, and works through a slot at M in opposite side of the box, and is covered with a shield, N, through which is a slit, O, to admit the slide or plate of glass holding the image. By moving the outer end of this support to and fro the angle of the picture to the reflector will be varied, and also the distances to and from the point of light, and therefore any desired degree of adjustment may be obtained.

A cover, as at P, may be provided to permit easy inspection of the inside, and for adjustment, if desired, and the reflector may be made adjustable; but it will be found preferable to fasten it in a proper position as related to the light, when made, as all adjustments may be made by the support, as already described.

By such an instrument, costing only two or three dollars, effects may be produced that will rival instruments with lenses costing five or six times as much.

I therefore claim—

1. A magic lantern having the combination of the illuminator with a reflector in such a manner that an interposed image or picture will be magnified and projected upon a screen or other receiver of the rays, and without the use of any lenses, as hereinbefore set forth.

2. In a magic lantern, the combination, with a case or box, of the adjusting-support for the image interposed between the illuminator and the reflector, as hereinbefore set forth.

In witness whereof I have hereunto subscribed my name and affixed my seal in the presence of two subscribing witnesses.

CHARLES FONTAYNE. [L. S.]

Witnesses:
EUGENE N. ELIOT,
CHAS. H. FONTAYNE, Jr.